United States Patent
Balbaugh et al.

(10) Patent No.: US 6,598,349 B1
(45) Date of Patent: Jul. 29, 2003

(54) WEATHERSTRIP ASSEMBLY WITH CONNECTING MEMBER

(75) Inventors: Jonathon H. Balbaugh, Ottawa, OH (US); Casey R. Gill, Clyde, OH (US); Gregory J. Grudzinski, Perrysburg, OH (US); Steven A. Ingraham, Bowling Green, OH (US)

(73) Assignee: Cooper Technology Services, LLC, Findlay, OH (US)

( * ) Notice: Subject to any disclaimer, the term of this patent is extended or adjusted under 35 U.S.C. 154(b) by 0 days.

(21) Appl. No.: 09/517,778

(22) Filed: Mar. 2, 2000

(51) Int. Cl.$^7$ ................................................. E06B 7/16
(52) U.S. Cl. .................... 49/490.1; 49/475.1; 49/498.1; 49/482.1
(58) Field of Search ............................. 49/475.1, 482.1, 49/490.1, 498.1, 479.1; 403/298, 292

(56) References Cited

U.S. PATENT DOCUMENTS

| | | | |
|---|---|---|---|
| 190,420 A | | 5/1877 | Davis |
| 1,245,099 A | | 10/1917 | Gross et al. |
| 2,986,793 A | | 6/1961 | Bright |
| 3,208,119 A | * | 9/1965 | Seckerson .................... 52/16.6 |
| 3,309,817 A | * | 3/1967 | Fisher ........................ 49/492.1 |
| 3,899,258 A | * | 8/1975 | Matthews ..................... 103/292 |
| 3,974,619 A | * | 8/1976 | Turner ........................ 52/716.2 |
| 4,248,017 A | * | 2/1981 | Micallef ...................... 49/493.1 |
| 4,432,166 A | | 2/1984 | Weimar |
| 4,624,093 A | * | 11/1986 | Gibson ..................... 52/717.05 |
| 4,701,066 A | * | 10/1987 | Beam et al. ................. 403/298 |
| 5,209,599 A | * | 5/1993 | Kronenberg ................. 403/298 |
| 5,243,747 A | | 9/1993 | Mesnel et al. |
| 5,376,423 A | | 12/1994 | Wiegand |
| 5,396,691 A | | 3/1995 | Wiegand |
| 5,419,800 A | * | 5/1995 | Moody ........................ 156/502 |
| 5,433,038 A | * | 7/1995 | Dupuy ......................... 49/377 |
| 5,538,580 A | | 7/1996 | Moody |
| 5,560,731 A | * | 10/1996 | Kronenberg ................. 403/298 |
| 5,893,675 A | * | 4/1999 | Lange ........................ 403/297 |
| 6,237,287 B1 | * | 5/2001 | Nakagawa et al. ........ 49/479.1 |

* cited by examiner

*Primary Examiner*—Gregory J. Strimbu
(74) *Attorney, Agent, or Firm*—Fay, Sharpe, Fagan, Minnich & McKee, LLP

(57) ABSTRACT

An apparatus and method for joining the ends of a weatherstrip from inside a channel section of the weatherstrip. A v-shaped fastening clip has a plurality of teeth extending therefrom and the orientation of the teeth can be altered to securely grip both ends of the weatherstrip. The v-shaped clip may also have a structural frame depending from it to define a w-shaped configuration. The w-shaped configuration provides flexural rigidity to the spliced section of the weatherstrip and additional strength and rigidity that is particularly useful for heavy components. The method comprises inserting the fastening clip (either the v-shaped or w-shaped configuration) into the first end of the weatherstrip and then inserting the fastening clip into the second end of the weatherstrip. The teeth of the fastening clip are then re-oriented to mechanically grip the weatherstrip.

18 Claims, 5 Drawing Sheets

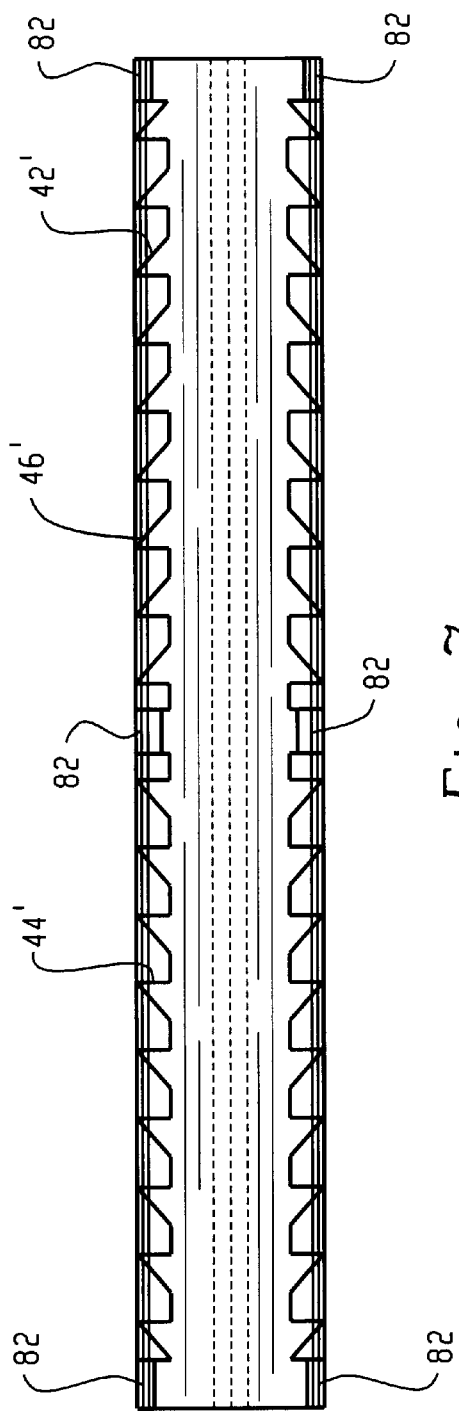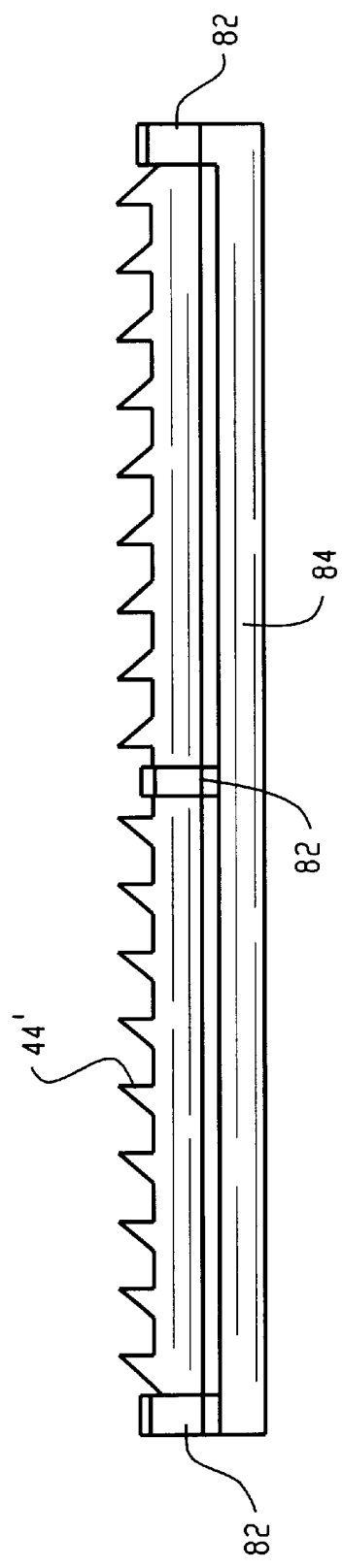

WEATHERSTRIP ASSEMBLY WITH CONNECTING MEMBER

BACKGROUND OF THE INVENTION

1. Field of the Invention

This invention relates to an apparatus and method of securing ends of a sealing strip. More particularly the invention relates to a fastener or clip for joining ends of a weatherstrip used to seal along openings of an automotive vehicle and the method of joining the weatherstrip will be described with reference to that environment.

2. Discussion of the Art

Generally, a weatherstrip assembly is mounted to a peripheral edge portion or flange surrounding an opening of an automotive vehicle. Ends of the weatherstrip assembly are joined to form a closed loop in order to properly seal that portion of the automotive vehicle from the elements.

In the prior art, the ends of the weatherstrip assembly are joined or spliced together using an adhesive, sometimes referred to as a "cold splice." Alternatively, various clips or fasteners have been developed, for use with or without the adhesive, to more securely join the weatherstrip ends together or fully molded joints have also been alternatively used. By way of example, reference is made to U.S. Pat. Nos. 5,538,580; 5,376,423; and 5,396,691 which show and describe different clip configurations and alternative methods of joining weatherstrip ends together.

Automotive manufacturers have minimum requirements relating to tensile pullout strength. That is, tensile strength testing imposes axial tensile forces on the spliced weatherstrip ends, i.e., at right angles to the plane of the joint, to determine the strength necessary to pull the spliced ends apart. Although use of a clip enhances the tensile strength of the splice relative to a splice that employs only an adhesive, known arrangements can benefit from further improvement.

Another consideration in forming splices relates to the aesthetics of the completed product. It is important that the spliced ends join together in a smooth transition that is not physically disrupted, i.e., no distortions, discolorations, etc.

Thus, it is desirable to develop a fastening clip that can overcome the deficiencies of the prior art without resulting in an overly expensive clip structure that is unduly complicated.

It is further desirable to adapt the assembly to an efficient method of joining the ends of the seal strip that is easy to use and attains repeatable, improved results.

SUMMARY OF THE INVENTION

The present invention contemplates an improved fastening clip and method for joining the ends of a seal strip or weatherstrip assembly.

According to the invention, a preferred form of fastening clip includes a w-shaped or v-shaped connecting member having teeth extending outwardly therefrom.

According to another aspect of the invention, the teeth extend from opposite sides of the connecting member and are disposed at opposite angles relative to the longitudinal axis from a central region of the fastening clip to engage the weatherstrip and longitudinally draw the weatherstrip ends together during assembly.

According to a preferred method of assembly, the fastening clip is inserted into a first end of the weatherstrip and then into the second end of the weatherstrip. The orientation of the teeth is then changed, for example by deforming the clip, resulting in an aggressive mechanical gripping of the weatherstrip.

According to an exemplary embodiment of the invention, the deforming step includes flattening a vertex or ridge in the w-shape or v-shape to drive the teeth into the weatherstrip or carrier.

A primary benefit of the invention is the ability to securely join the two ends of the weatherstrip with or without adhesives.

Another advantage of the invention resides in the ability to splice together two ends of weatherstrip to achieve a higher tensile strength than known assemblies.

Yet another advantage of the invention is an ability to splice together two ends of weatherstrip and provide a spliced section having increased shear resistance.

Still another benefit is realized by the adaptability of the invention to extrudate splices having lance and stretch carrier parts, a stamped metal carrier, or wire carrier components.

Still other benefits and advantages of the present invention will become apparent to those skilled in the art upon reading the following detailed description.

BRIEF DESCRIPTION OF THE DRAWINGS

FIG. 7 is a plan view of the second preferred embodiment.

FIG. 8 is an elevational view of the second preferred embodiment.

DETAILED DESCRIPTION OF THE PREFERRED EMBODIMENTS AND METHOD

Figure 1:
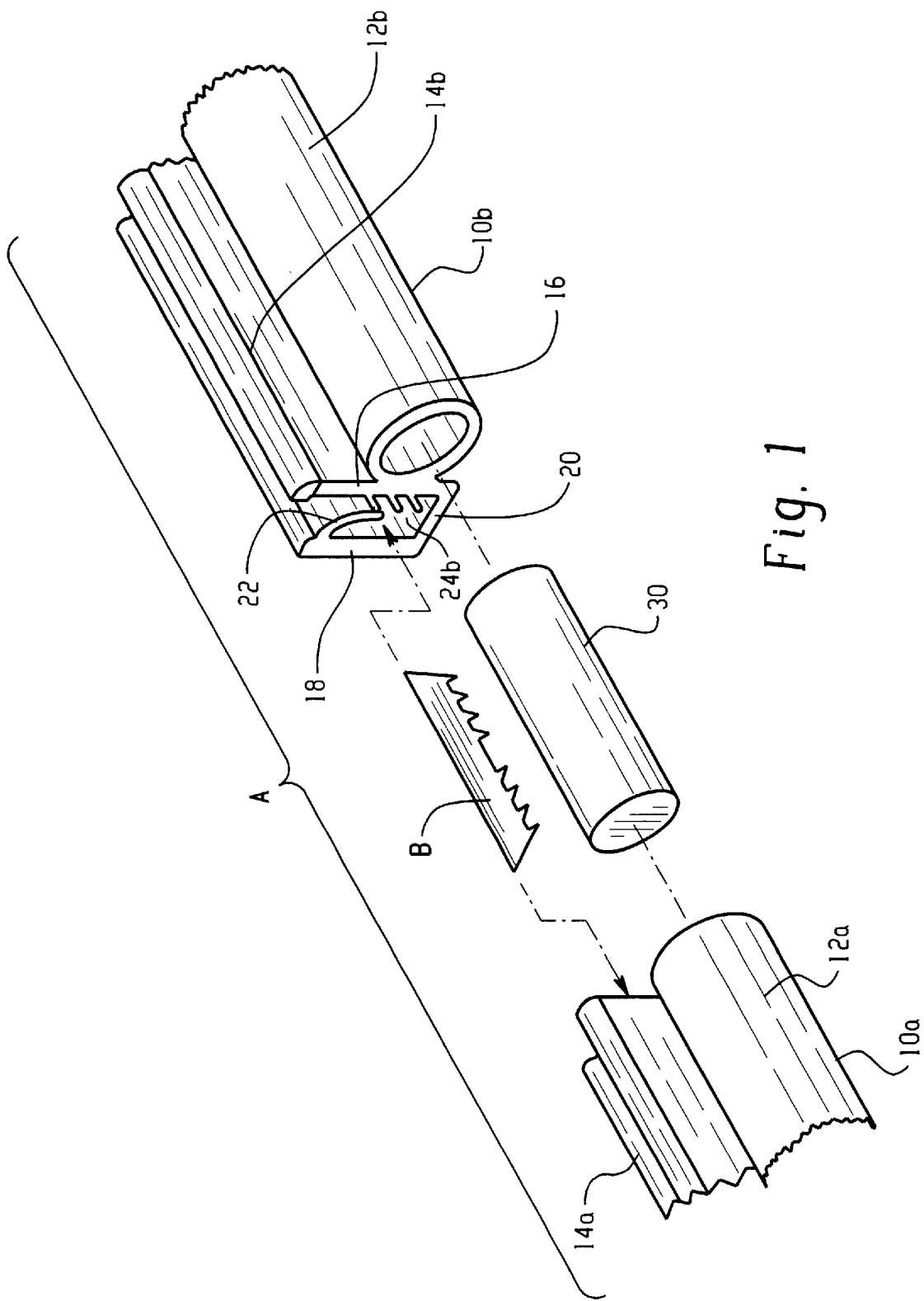
FIG. 1 is an exploded, perspective view of two ends of weatherstrip and a connector plug prior to insertion of a connecting member therein.

Reference is made to the drawings which illustrate preferred embodiments and a method of the invention only, and are not intended to limit the invention. FIG. 1 shows an exploded view of separated, terminal ends of a seal strip or weatherstrip assembly A. For brevity and understanding, elements of one end of the weatherstrip will be identified with a suffix "a" and like elements of another end will be identified with a suffix "b". The assembly A includes a conventional weatherstrip 10a, 10b that has a generally cylindrical sealing portion 12a, 12b and a carrier 14a, 14b fixed thereto—for example extruded together in a coextruder assembly. The weatherstrip is shown with a hollow, generally cylindrical sealing portion, and the carrier is shown as a generally U-shaped conformation, although it will be appreciated that other weatherstrip configurations or conformations may be used in accordance with the present invention. The carrier 14a, 14b is interiorly reinforced, for example with an encapsulated core such as a malleable aluminum or stainless steel strip, and/or fiber reinforcement, the details of which do not form a particular part of the present invention so that further discussion herein is unnecessary. The illustrated carrier includes a first leg 16a, 16b and a second leg 18a, 18b extending from an interconnecting portion 20. A plurality of projections or fingers 22 extend from the first leg 16a, 16b or second leg 18a, 18b toward an interior cavity or channel 24a, 24b of the carrier. The channel 24a, 24b of the carrier 14a, 14b is dimensioned to receive the flange of an automotive vehicle (not shown) to which the weatherstrip assembly is secured. The channel also receives a connecting member or fastening clip B as will be described in greater detail below and the hollow sealing portion receives a connector plug 30.

Figure 2:
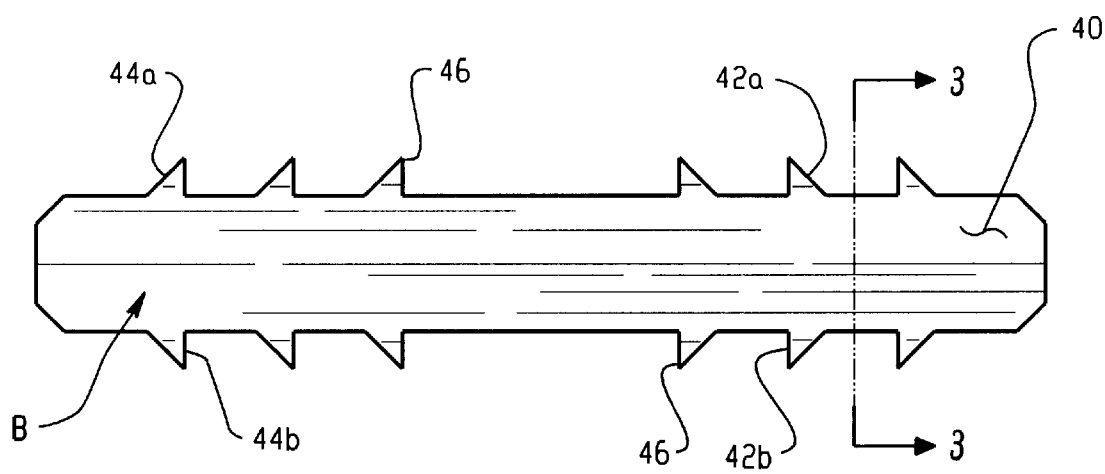
FIG. 2 is a plan view of a first embodiment of connecting member used to join two ends of a weatherstrip.
Figure 3:
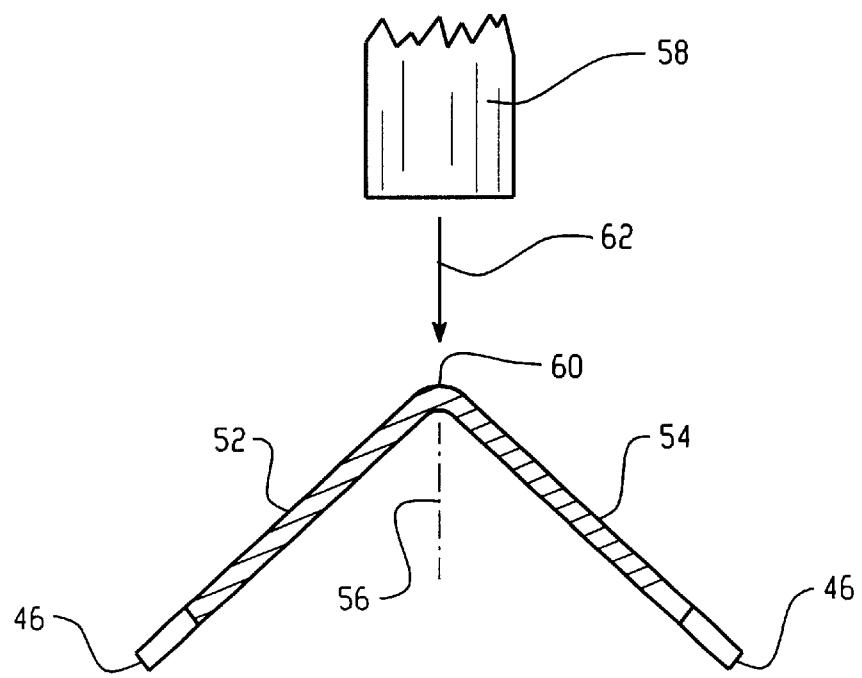
FIG. 3 is a cross-sectional view of FIG. 2 taken generally along the lines 3—3 of FIG. 2.

The particular details of the structure, function, and advantageous features of the fastening clip will be described with continued reference to FIG. 1 and more detailed reference to FIGS. 2 and 3. As shown there, a first embodiment of the fastening clip B comprises a v-shaped connecting member 40 having a first set of teeth 42 angled in one direction and a second set of teeth 44 angled in another or opposite direction. The teeth are preferably oriented so that the angled faces (42a, 44a) are directed outwardly toward the respective ends of the clip thereby allowing easier insertion of the fastening clip into the end of the weatherstrip. The perpendicular faces (42b, 44b) of the teeth are disposed inwardly toward the middle of the clip to inhibit pullout of the clip once it is inserted into the weatherstrip. The teeth 42, 44 are nearly right triangular in shape with the base disposed along the connecting member 40 and the pointed or barbed ends 46 of the teeth extending outwardly from the v-shaped member.

The fastening clip B is preferably fabricated from a thin, one-piece, malleable metal for reasons which will become more apparent below. FIG. 3 shows the v-shaped member comprised of a first plane 52 and a second plane 54, where both planes join/intersect and originate at a longitudinal axis 56. In the preferred embodiment, the included angle defined by the planes is an acute angle between forty five (45°) and ninety degrees (90°), although other angles are contemplated if they achieve the objectives of the present invention. The teeth 42, 44 are located in the respective planes 52, 54.

The minimum distance or width between the barbed ends of teeth disposed on opposite sides of the longitudinal axis is approximately the same as or slightly less than the width of the channel in the weatherstrip where the fastening clip B is to be inserted. Once the fastening strip is inserted in the channel, the orientation of the teeth is altered. In accordance with the preferred method, the angle between the teeth is increased so that the width or distance between the teeth is increased. This is accomplished by using a blade 58 that engages the v-shaped member along a vertex 60 of the planes. The vertex is urged by the blade (as represented by reference arrow 62 in FIG. 3) toward a plane defined by the minimum distance between the teeth. This increases the included angle between the teeth and likewise increases the minimum distance between the teeth so that the width is slightly greater than the width of the channel in the weatherstrip where the fastening clip B is inserted. This provides an aggressive, secure engagement between the weatherstrip and the fastening clip.

Moreover, the opposite angled relationship of the teeth 42, 44 also has the desirable added feature of drawing the weatherstrip ends toward one another during the assembly process. The angle of the teeth urges the teeth to bite into the elastomeric material from which the weatherstrip is formed as the spine or vertex 60 of the v-shaped connecting member is engaged by the blade and the fastening clip is deformed to a new orientation in which the include angle between the teeth is increased and the distance between them is increased. This provides for a close fitting butt splice between the terminal ends of the weatherstrip where a butt splice is understood as the alignment and joining, without overlapping, of the two ends of the extrudate.

To summarize, the terminal ends of the weatherstrip are joined in the following manner. For purpose of brevity and understanding, elements of the weatherstrip first end will be identified with a suffix "a" while like elements of the second end will be identified with a suffix "b", it being understood that the first and second ends are structurally and functionally identical unless stated otherwise. The two ends of the weatherstrip 10 are brought together. The fastening clip B is inserted into the first end of the weatherstrip 10a. More specifically, the fastening clip B is partially inserted (approximately midway) into the channel 24a of the carrier. Next, the connector plug 30 is partially inserted into the first end of the weatherstrip 10a, more specifically into the hollow sealing portion 12a of the weatherstrip. Adhesive may be applied to the connector plug 30 prior to insertion into the first end of the weatherstrip.

Next the remainder or exposed end of the fastening clip B is inserted into the second end of the carrier channel 24b. While inserting the fastening clip B into the second end of the weatherstrip, the connector plug 30 is also inserted into the second sealing portion 12b.

Figure 4:
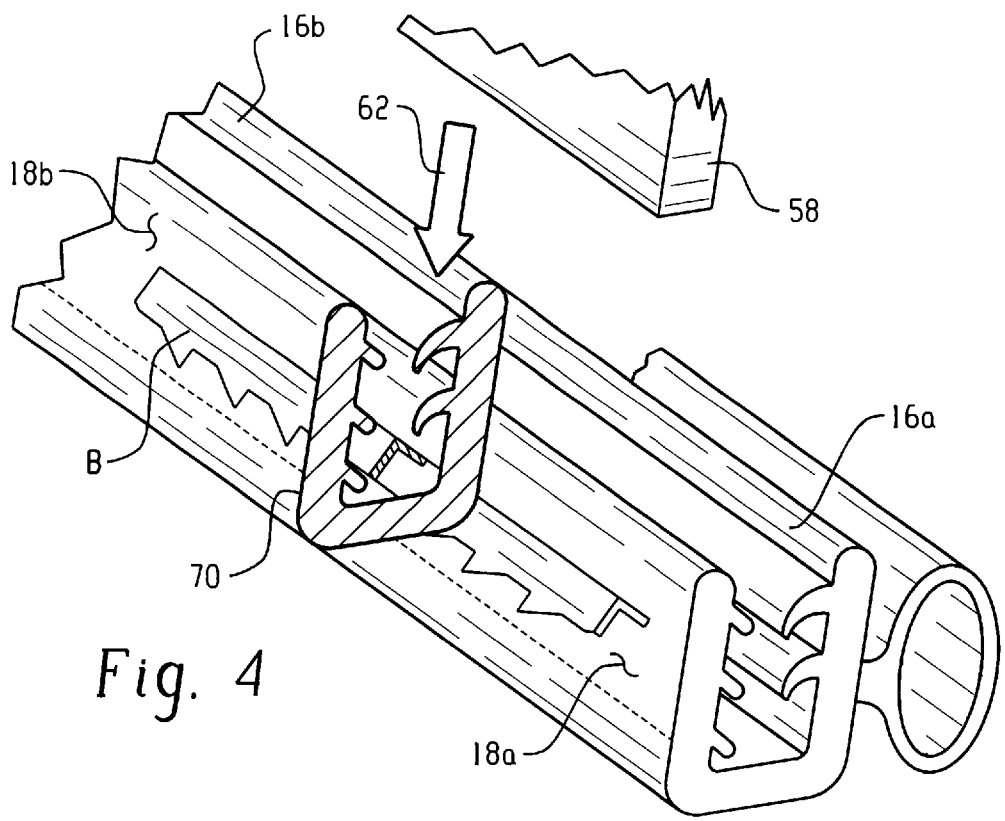
FIG. 4 is a perspective view of the weatherstrip loaded into a support fixture.
Figure 5:
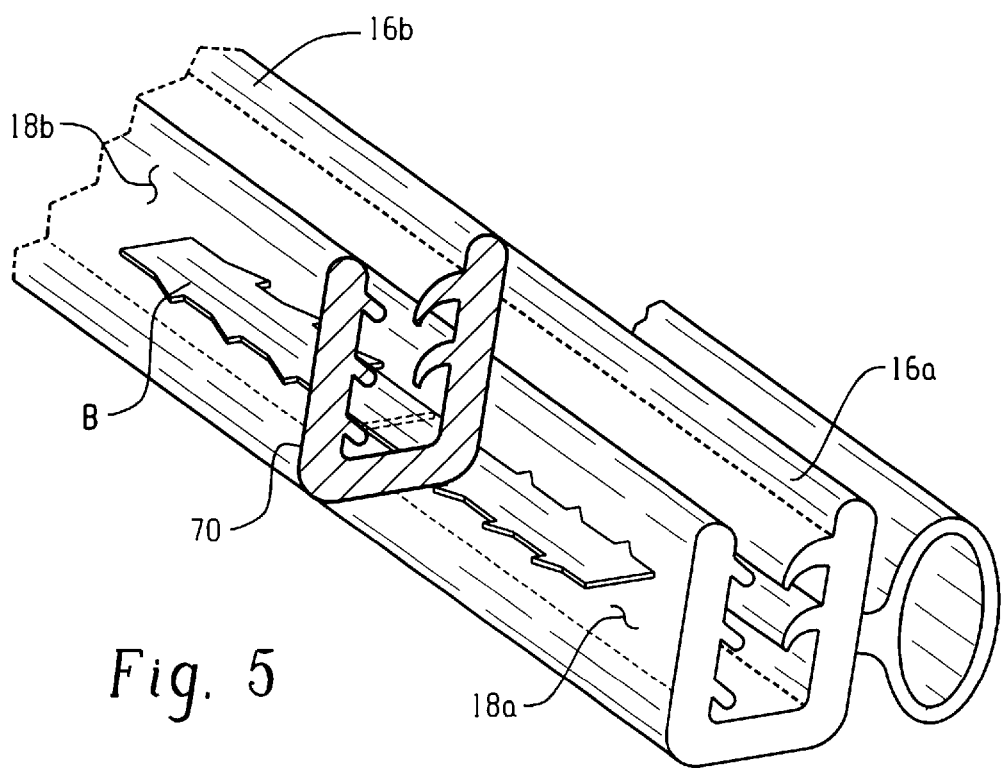
FIG. 5 is a perspective view of the weatherstrip assembly after deformation of the connecting member.

Referring to FIGS. 4 and 5, the joined weatherstrip 10 is then loaded into a support fixture. In the preferred embodiment, splice 70 of the weatherstrip is centered beneath the blade 58. For ease and brevity, elements on one end of the fastener clip will be referred to with the suffix "a" and elements on the other side of the fastener clip will be referred to with suffix "b". The teeth 42a, 42b, 44a, 44b of the fastening clip B are facing down and away from the blade 58. The orientation of the teeth is altered by advancing the blade against the vertex of the fastening clip B. The blade plastically deforms the fastening clip into the desired orientation (FIG. 5) and is then retracted from the channel to repeat the process on a new splice.

Figure 6:
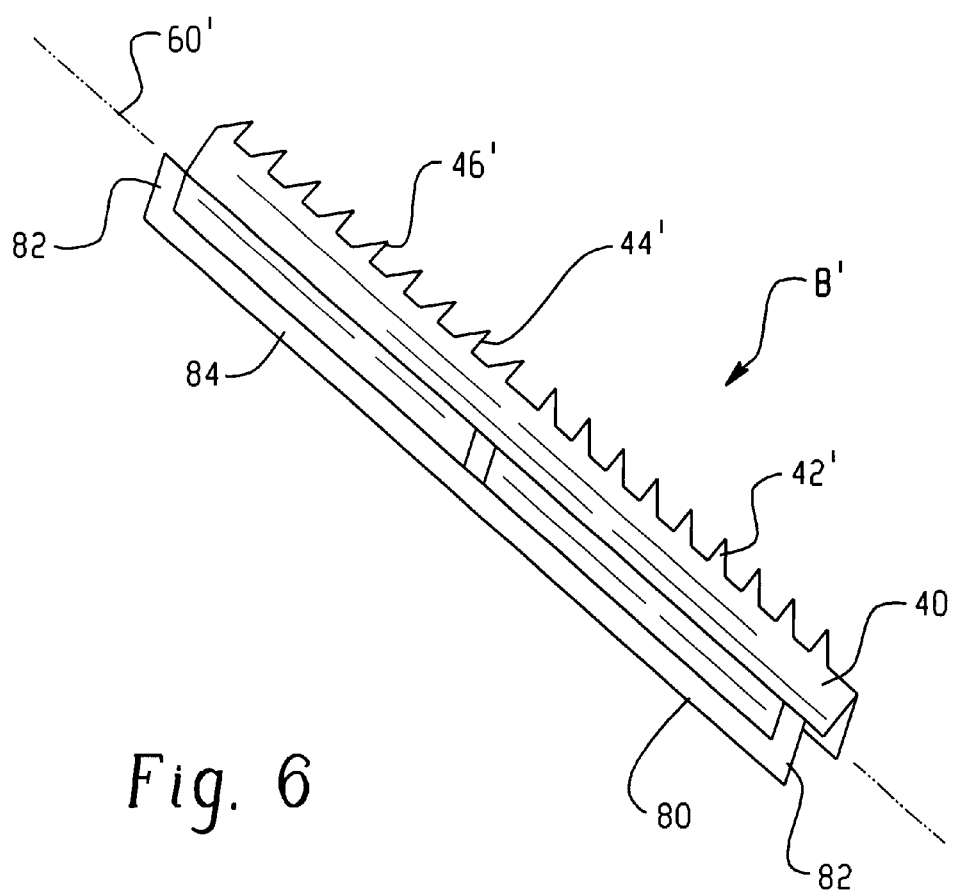
FIG. 6 is a perspective view of a second preferred embodiment of the connecting member.
Figure 9:
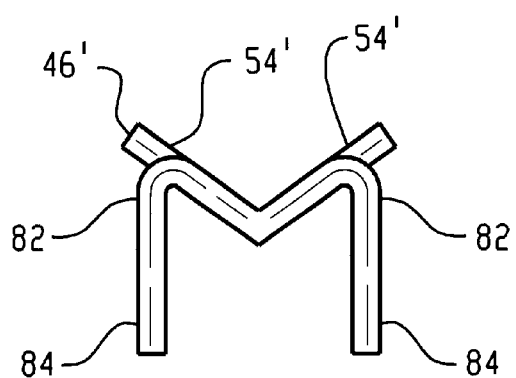
FIG. 9 is an end view of the second embodiment taken generally from the right-hand end of FIG. 8.

FIG. 6 shows a second embodiment of the fastening clip. For ease of reference, like elements are identified by like numerals with a primed suffix (') and new elements are identified with a new numeral. The fastening clip B' has a structural frame 80 depending from the v-shaped connecting member 40' having teeth 42', 44', thus defining what is termed a w-shaped connecting member. The structural frame 80 includes a plurality of struts 82 and shear resistance members 84. The structural frame provides flexural rigidity to the fastening clip and ultimately to the splice in the assembled weatherstrip.

FIG. 7 shows the struts 82 on both sides of the v-shaped connecting member depending nearly perpendicular to the longitudinal axis 60'. The struts bridge the shear resistance members 84 to the v-shaped connecting member 10. FIG. 8 shows a shear resistance member 84 extending over the entire longitudinal dimension of the fastening clip B and is substantially parallel to the shear resistance member 84 located on the opposite side of the longitudinal axis 60. In the preferred embodiment, both the struts 82 and the shear resistance members 84 are generally rectangular in shape and are integrally formed from the same material as the v-shaped member 40'.

Although the configurations of the fastening clip embodiments of FIGS. 1–3 and 6–9 are different, the above described method of assembling and forming the butt splice applies to both embodiments. The blade engages the fastening clip and re-orients the teeth to aggressively grip the weatherstrip and dramatically improve the tensile pullout strength of the assembly. Moreover, since a vertex with teeth extending outwardly therefrom is deformed in each of the preferred embodiments of FIGS. 2–5 and FIGS. 6–9, then reference to a v-shaped configuration of the legs applies equally to both embodiments. Tests indicate that these fastening clip embodiments exhibit excellent results relative to known extrudate splices, achieving the strongest known splice for extrudates containing a lance and stretch or stamped metal carrier sections. The v-shaped configuration of FIGS. 2–7 is particularly useful with those extrudates including a wire carrier while the w-shaped configuration is useful in both wire and lance and stretch carrier extrudates and other circumstances where increased strength and rigidity are required.

The invention has been described with reference to the preferred embodiments. Obviously, modifications and alterations will occur to others upon reading and understanding of this specification. Still other configurations of the fastening clip can be used, alternative materials of construction can be used, or the conformation of the weatherstrip can vary also. The invention is intended to include all such modifications and alterations in so far as they come within the scope of the appended claims and the equivalents thereof.

Having thus described the invention, it is now claimed:

1. A weatherstrip assembly comprising:

a seal member;

a carrier member secured to the seal member; and an elongated connecting member received in the carrier member, the connecting member having teeth disposed on first and second legs extending from one another to define a generally v-shaped configuration in a cross section perpendicular to a longitudinal axis of the connecting member the connecting member being formed of a malleable metal material so that the configuration of the legs can be altered by an external force to allow the teeth to engage the carrier member.

2. The weatherstrip assembly of claim 1 wherein the teeth are spaced apart a first distance that is slightly less than a predetermined width of a channel of the carrier member when the legs are in the generally v-shaped configuration and the teeth are spaced apart a second distance that is slightly greater than the predetermined width of the channel of the carrier member when the legs are in the altered configuration.

3. The weatherstrip assembly of claim 1 further comprising a structural frame extending from said connecting member.

4. The weatherstrip assembly of claim 3 wherein the structural frame includes struts depending from the connecting member.

5. The weatherstrip assembly of claim 4 wherein the structural frame further comprises shear resistance members depending from the struts.

6. The weatherstrip assembly of claim 1 wherein the seal member is hollow.

7. The weatherstrip assembly of claim 6 further comprising a connector received in the hollow seal member.

8. The weatherstrip assembly of claim 1 wherein the carrier member includes third and fourth legs extending from the first and second legs.

9. The weatherstrip assembly of claim 8 wherein the connecting member first and second legs and the third and fourth legs define a generally w-shaped conformation.

10. The weatherstrip assembly of claim 1 wherein the carrier member includes a core.

11. The weatherstrip assembly of claim 10 wherein the core is metal.

12. The weatherstrip assembly of claim 10 wherein the core is a fiber reinforcement member.

13. The weatherstrip assembly of claim 1 further comprising a channel in the carrier member dimensioned to receive the connecting member.

14. The weatherstrip assembly of claim 13 further comprising plural projections extending into the channel.

15. The weatherstrip assembly of claim 1 wherein a first set of the teeth have a region directed toward first end of the connecting member and a second set of the teeth have a region directed toward a second end of the connecting member.

16. A weatherstrip assembly comprising:

an elastomeric seal member;

a rigid carrier member having an elastomeric outer layer secured to the seal member; and an elongated metallic connecting member received in the carrier member, the connecting member having first and second ends and first and second legs extending from one another to define a generally v-shaped configuration in a cross section perpendicular to a longitudal axis of the connecting member.

17. A weatherstrip assembly comprising:

a seal member a generally u-shaped carrier member secured to the seal member and comprising an elastomeric layer that at least partially surrounds a rigid layer; and a metallic elongated connecting member having gripping teeth, the member having a first, generally v-shaped configuration in a cross section perpendicular to a longitudinal axis of the connecting member that can change to a second configuration.

18. The weatherstrip assembly of claim 17 wherein the rigid layer comprises metal.

* * * * *